Oct. 28, 1952     E. T. WAHLBOM     2,615,605
BOTTLE CARRIER
Filed Dec. 13, 1947     7 Sheets-Sheet 1
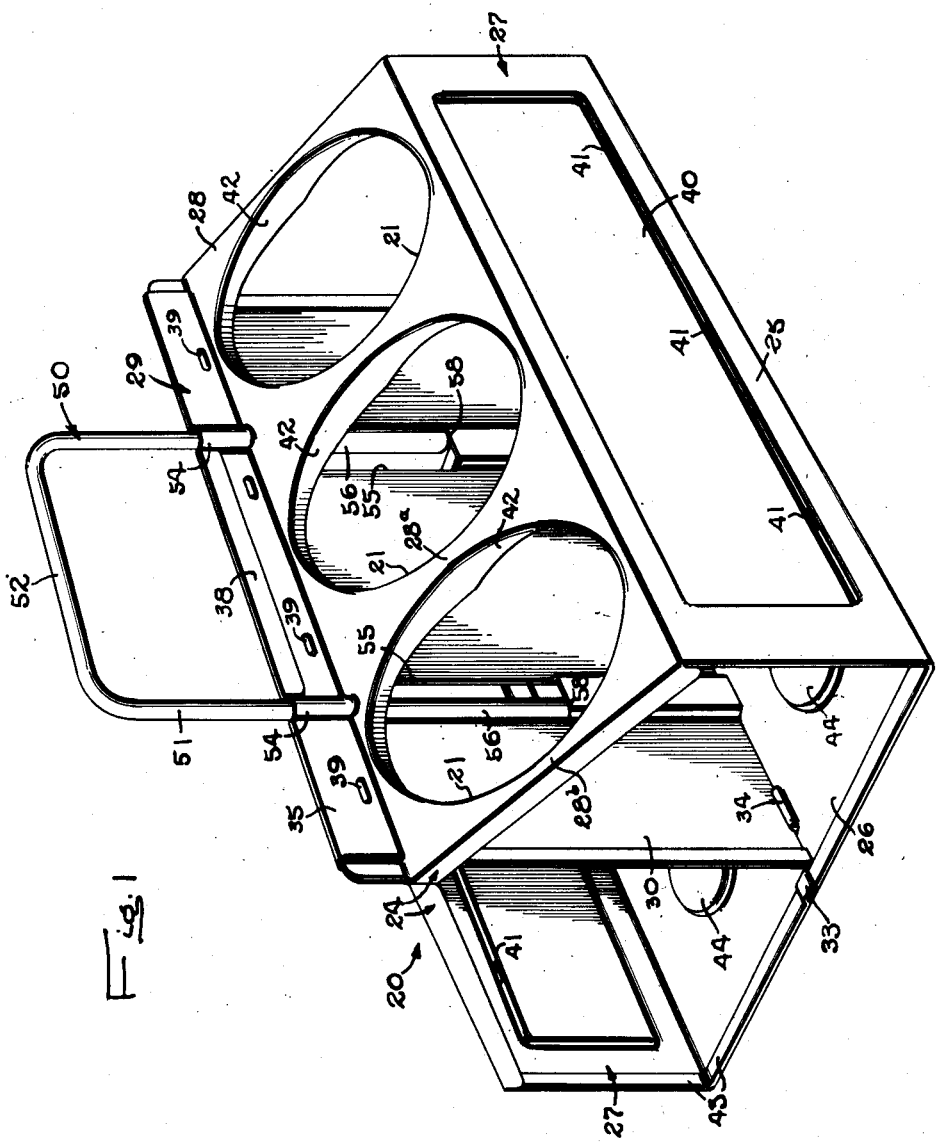
INVENTOR
Ernest T. Wahlbom Oct. 28, 1952    E. T. WAHLBOM    2,615,605
BOTTLE CARRIER
Filed Dec. 13, 1947    7 Sheets-Sheet 2
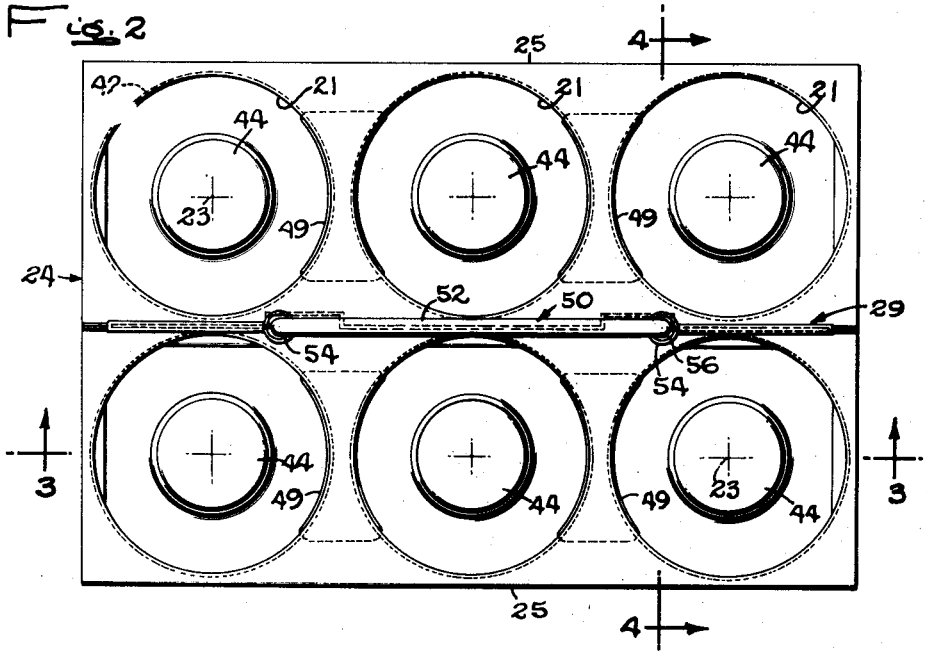
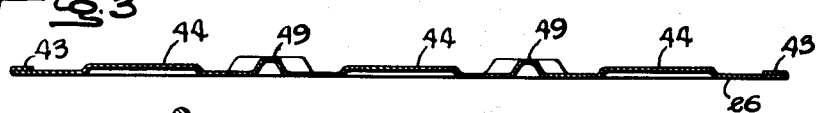
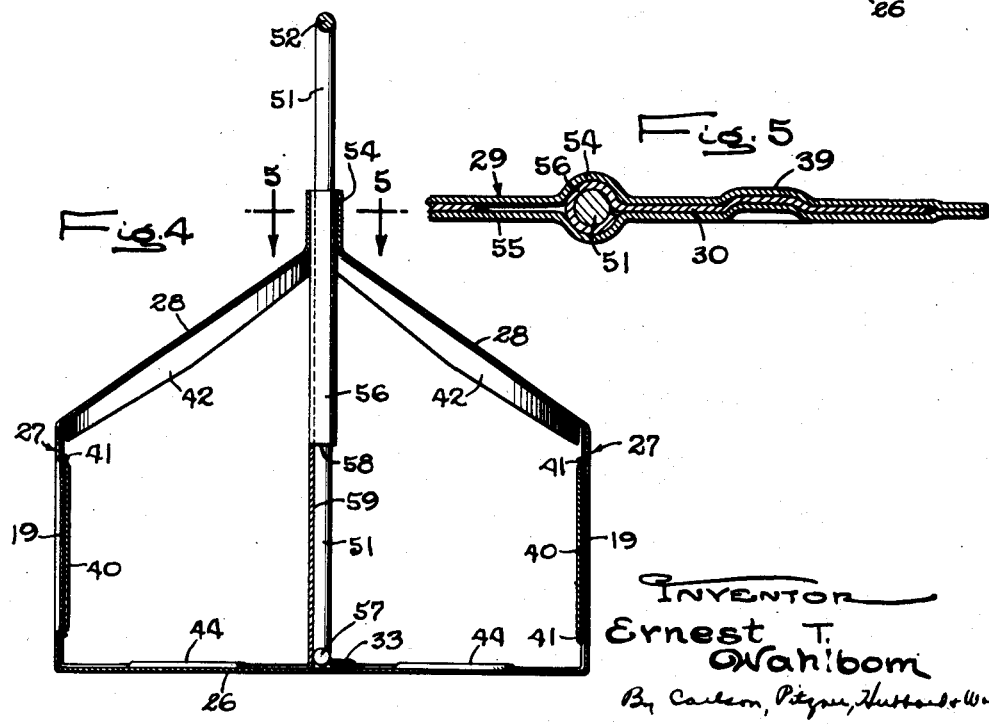
INVENTOR
Ernest T. Wahlbom
By Carlson, Pitzner, Hubbard & Wolfe
ATTORNEYS Oct. 28, 1952     E. T. WAHLBOM     2,615,605
BOTTLE CARRIER
Filed Dec. 13, 1947     7 Sheets-Sheet 3
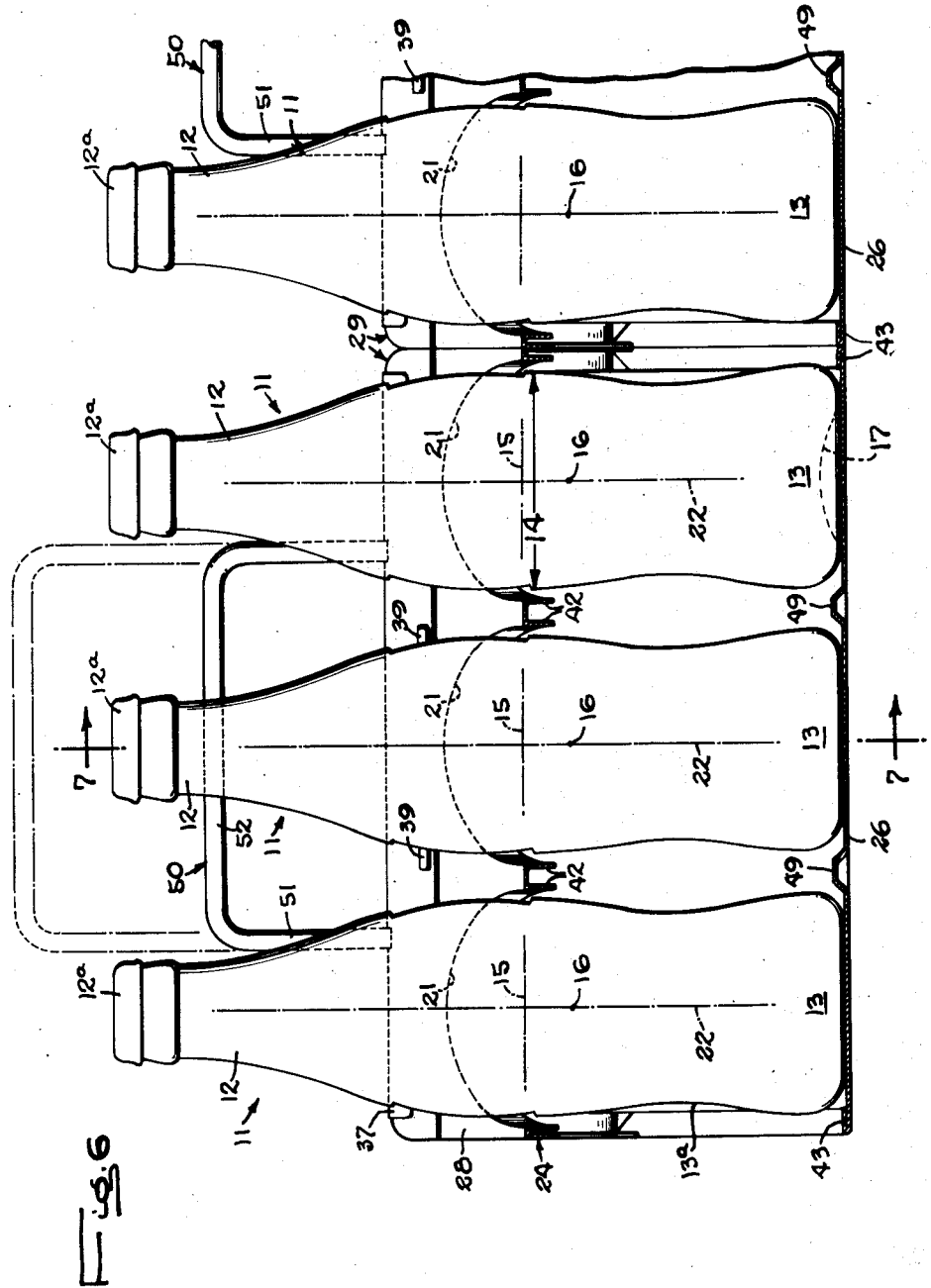
INVENTOR
Ernest T. Wahlbom
By Carlson, Pitzner, Hubbard & Wolfe
ATTORNEYS Oct. 28, 1952     E. T. WAHLBOM     2,615,605
BOTTLE CARRIER
Filed Dec. 13, 1947     7 Sheets-Sheet 4
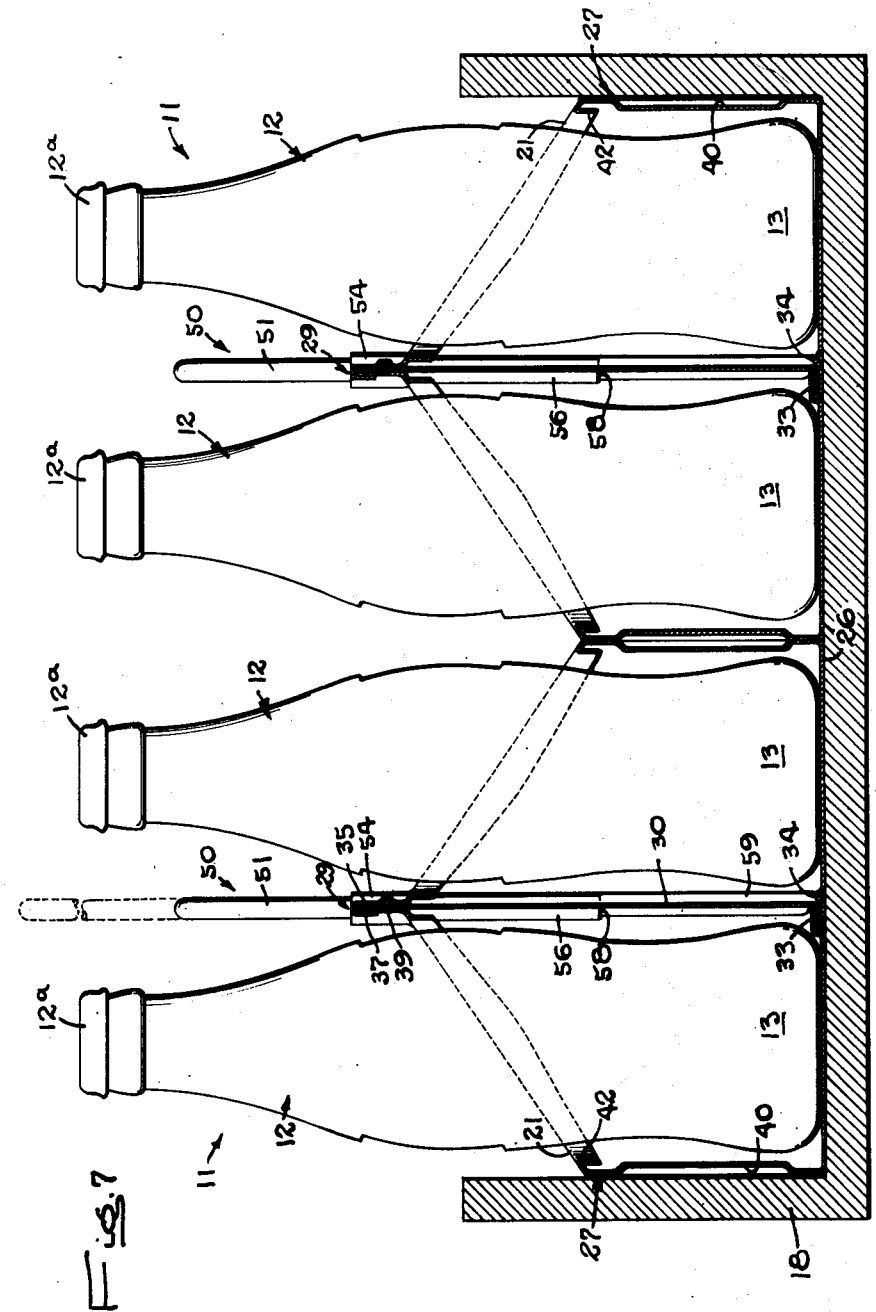
INVENTOR
Ernest T. Wahlbom
By Carlsen, Pitzner, Hubbard & Wolfe
ATTORNEYS Oct. 28, 1952     E. T. WAHLBOM     2,615,605
BOTTLE CARRIER
Filed Dec. 13, 1947     7 Sheets-Sheet 5
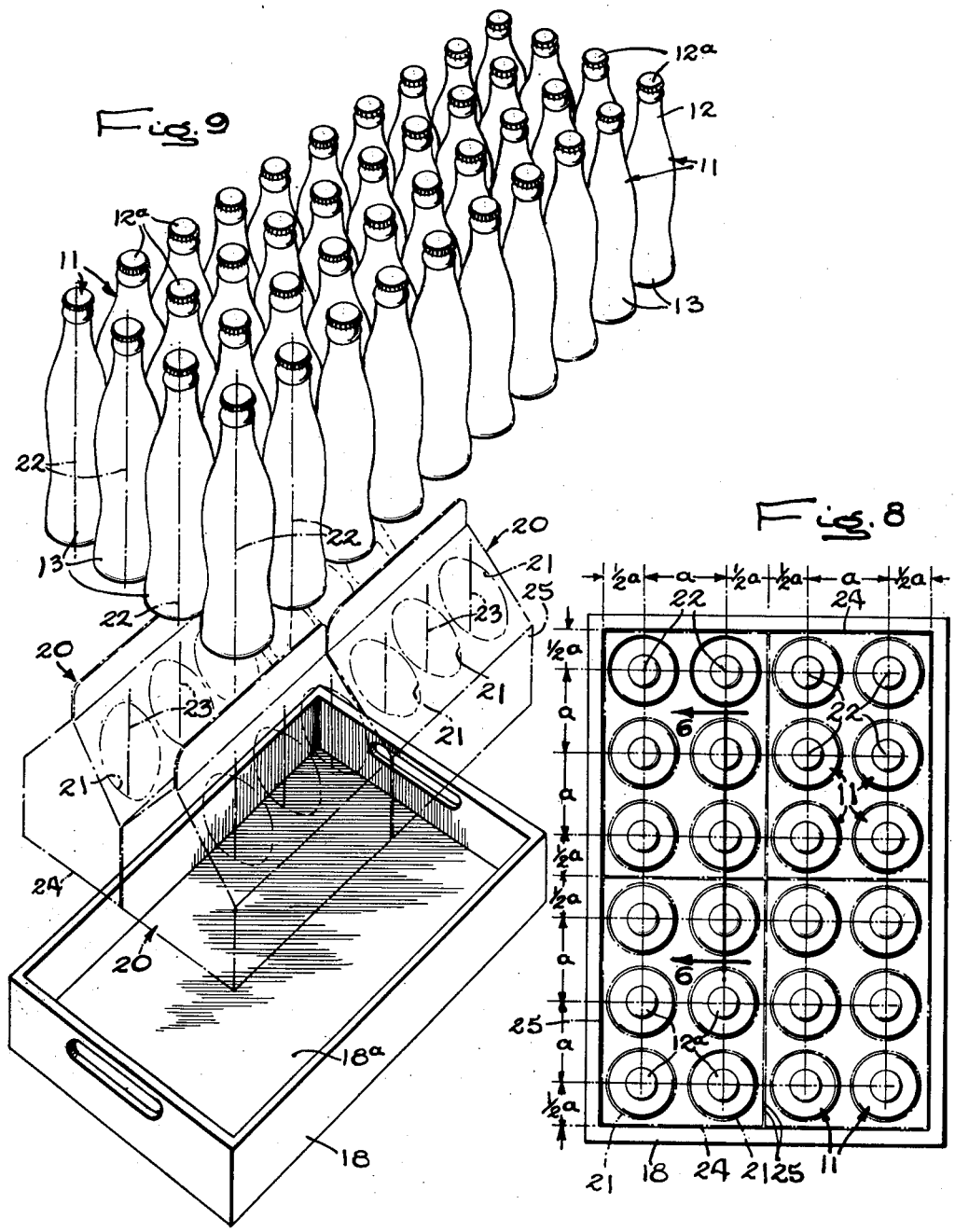
INVENTOR
Ernest T. Wahlbom
By Carlson, Pitzner, Hubbard & Wolfe
ATTORNEY Oct. 28, 1952 E. T. WAHLBOM 2,615,605
BOTTLE CARRIER
Filed Dec. 13, 1947 7 Sheets-Sheet 6
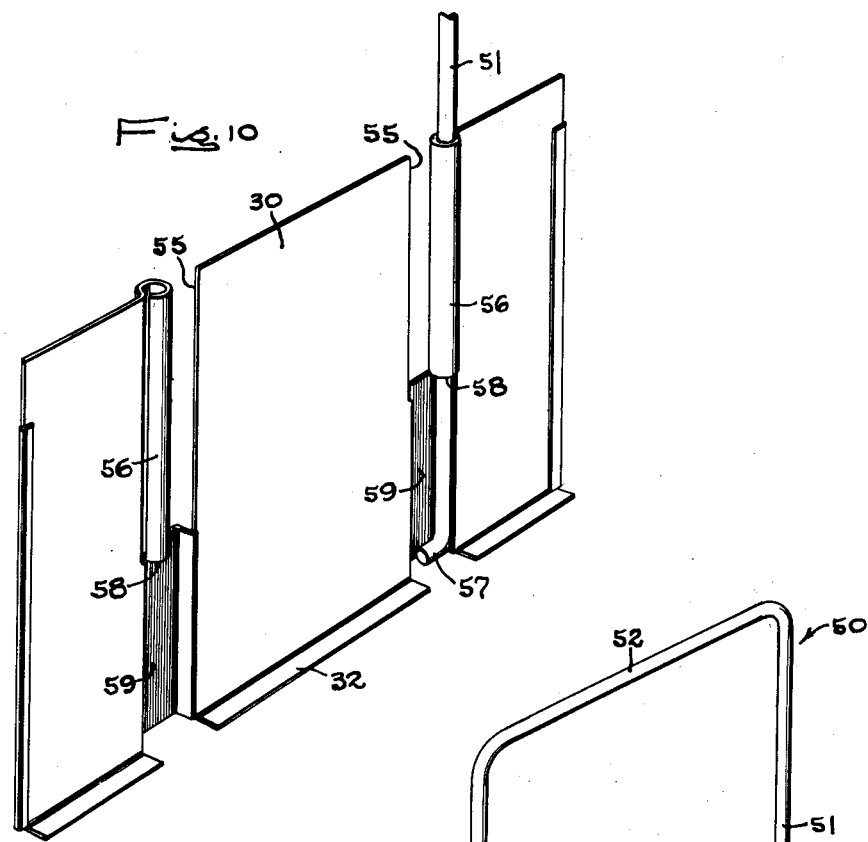
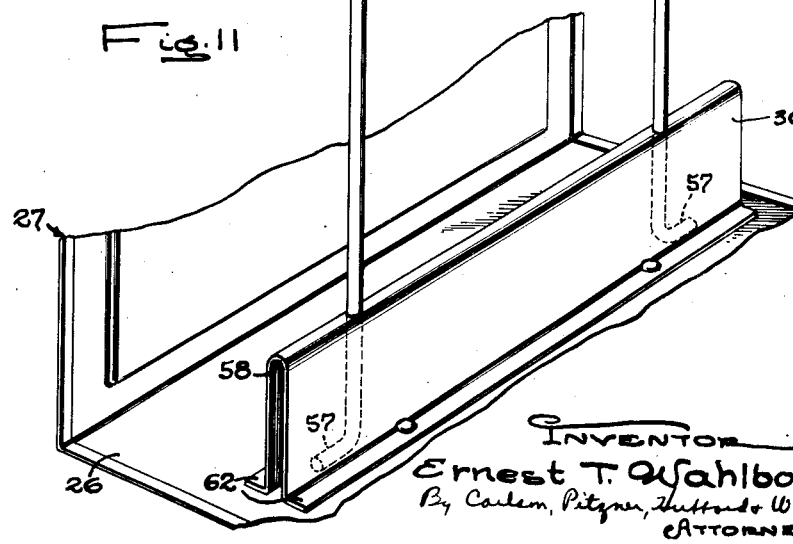
INVENTOR
Ernest T. Wahlbom
By Carlsen, Pitzner, Hubbard & Wolfe
ATTORNEY Oct. 28, 1952 E. T. WAHLBOM 2,615,605
BOTTLE CARRIER
Filed Dec. 13, 1947 7 Sheets-Sheet 7
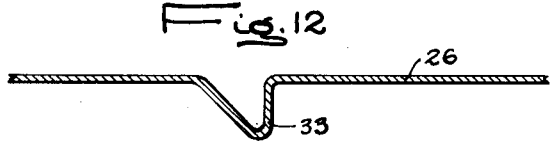
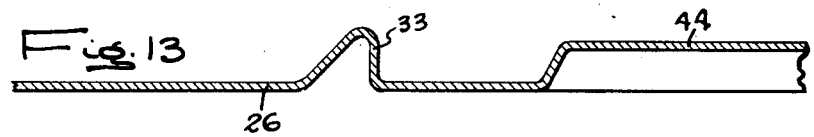
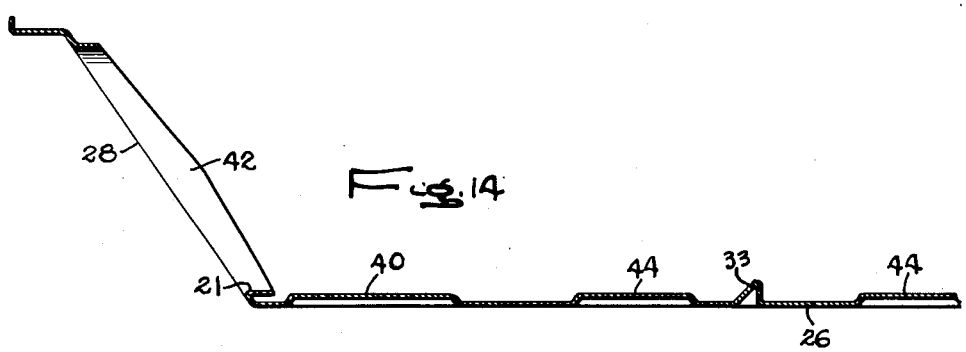
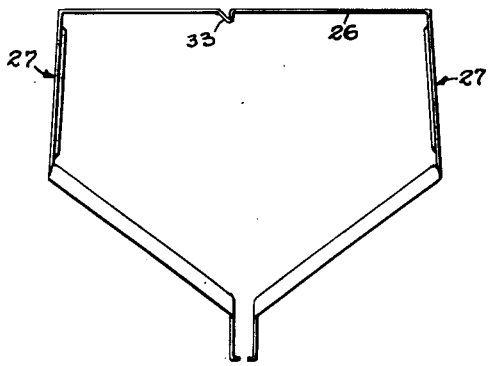
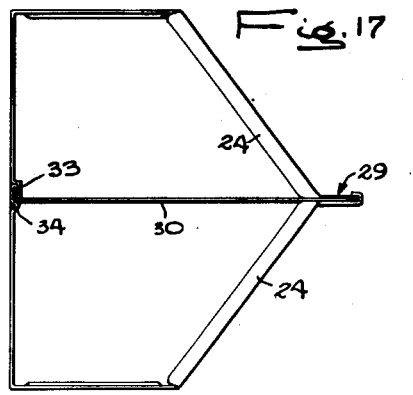
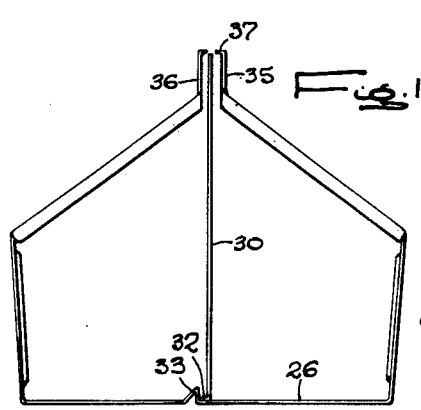
INVENTOR
Ernest T. Wahlbom
By Carlsen, Pitzner, Hubbard & Wolfe
ATTORNEY Patented Oct. 28, 1952

2,615,605

UNITED STATES PATENT OFFICE 2,615,605

BOTTLE CARRIER

Ernest T. Wahlbom, Rockford, Ill., assignor, by direct and mesne assignments, of one-half to said Wahlbom, Rockford, Ill., and one-half to Osborne E. Griggs, East Hartford, Conn.

Application December 13, 1947, Serial No. 791,568

8 Claims. (Cl. 224—45.)

This invention relates to a carrier for beverage bottles of the type which are usually transported to and from stores or other dispensing stations in boxes or cases. To facilitate the sale of the bottled beverage in less than case lots, the bottles are sometimes packaged in smaller numbers in cardboard cartons in which the bottles are usually held frictionally and spaced from each other differently than in the regular cases. Such cartons are short lived, and the necessity of loading and unloading by hand increases bottling costs substantially as compared to the handling of the bottles in cases.

The primary object of the present invention is to overcome the difficulties above mentioned and provide a bottle carrier which may be arranged in multiple in a standard bottle case and which is adapted to receive bottles loosely and in the spacing requisite for machine loading in the same machine that is used for loading the bottles in cases.

Another object is to provide a carrier of the above character which is also substantially more durable in service use than the cartons heretofore used, which is more easily unloaded and cleaned, and which may be decorated more attractively.

A further object is to provide such a carrier in which the bottles, although loosely received therein, are always held separated and out of contact with each other and, at the same time, are prevented from falling or tipping out of the carrier in normal handling.

Still another object is to provide a carrier made of light gauge sheet metal and reinforced in a novel manner to impart optimum rigidity to the carrier and resist bending thereof by the shocks encountered in service.

The invention also resides in the novel manner of mounting a separately formed handle on the carrier so as to strengthen the carrier as a whole and minimize the danger of the carrier becoming deformed in service use.

A further object is to provide a sheet metal carrier open at opposite ends and constructed in a novel manner to permit hemming of the exposed metal edges.

Another object is to provide a sheet metal carrier which has the advantageous characteristics above mentioned and which at the same time is capable of being made largely by mass production methods and therefore at low cost.

Other objects and advantages of the invention will become apparent from the following detailed description taken in connection with the accompanying drawings, in which Figure 1 is a perspective view of the improved carrier in its preferred form.

Fig. 2 is a plan view.

Fig. 3 is a sectional view of the carrier bottom, the section being taken along the line 3—3 of Fig. 2.

Fig. 4 is a cross section taken along the line 4—4 of Fig. 2.

Fig. 5 is a fragmentary section taken along the line 5—5 of Fig. 4.

Fig. 6 is a sectional view taken along the line 3—3 of Fig. 2 and line 6—6 of Fig. 8 with the carrier filled and disposed in end contact with a second carrier.

Fig. 7 is a sectional view taken along the line 7—7 of Fig. 6, with the carrier in side contact with a second carrier.

Fig. 8 is a plan view of a standard bottle case containing four of the improved carriers filled with bottles and shown schematically.

Fig. 9 is an exploded perspective view showing the relation of the bottles, carriers, and a case during loading of the bottles in one form of automatic loading machine.

Fig. 10 is a fragmentary perspective view of the center partition of the carrier.

Fig. 11 is a fragmentary broken away view of a modified form of the carrier.

Figs. 12, 13 and 14 are fragmentary sectional views and Figs. 15, 16 and 17 are end views illustrating the manner of fabricating the carrier from sheet metal.

While the invention is susceptible of various modifications and alternative constructions, I have shown in the drawings and will herein describe in detail the preferred embodiments. It is to be understood, however, that I do not intend to limit the invention by such disclosure but aim to cover all modifications and alternative constructions falling within the spirit and scope of the invention as expressed in the appended claims.

The improved carrier as shown in the drawings for purposes of illustration is especially adapted for use with bottles 11 each having a relatively short neck 12 and a body 13 (Figs. 6 and 7) the maximum diameter 14 (2⅜ of an inch) of which extends downwardly past the longitudinal center 15 to a point somewhat above the center of gravity 16 of the bottle when filled. The bottle body 13 is contracted somewhat as indicated at 13ª below the maximum diameter and diverges again to this diameter at the lower end which is formed with a bottom recess 17.

When not packaged in cartons, such bottles are handled in cases having a relatively shallow rectangular wooden frame 18 (Figs. 8 and 9), a flat bottom 18ᵃ and crossed partitions (not shown) holding the bottles loosely separated from each other with the bottle axes 22 evenly spaced apart about 2¾ inches lengthwise and crosswise of the case and with the bottles arranged in four rows of six bottles each. Such cases are adapted for automatic or machine loading by dropping all or one row of the bottles at a time endwise past guide fingers (not shown) into the respective recesses defined by the case partitions.

The present invention aims to provide a carrier 20 (Figs. 1 and 9) which may be arranged in multiple within the frame 18 of a standard carrying case with the necessary clearance and which has two rows of a plurality of holes 21 to loosely receive the respective bottles of a case by an axial movement thereof, the centers 23 (Fig. 9) of the adjacent holes 21 in each carrier and in adjacent carriers being spaced apart the same distance as the bottle centers 22 in a standard partitioned case. Thus, a case of standard size with the partitions omitted may be utilized for machine loading and handling of bottles arranged in a plurality of the carriers 20 received within the case frame 18 (Fig. 9).

The foregoing positional relationship of the bottle holes 21 is made possible in accordance with my invention by a novel construction of the carrier 20 and the location of the bottles therein so that the hole centers 23 are spaced equal distances $a$ apart, the centers of the terminal bottles in each row are spaced from the ends 24 of the carrier a distance equal to one-half of the space $a$, and each bottle is spaced the same distance, that is, ½ $a$ from the side 25 of the carrier. In this instance, $a$ is $2\frac{13}{32}$ inches.

To achieve these ends and at the same time obtain a rigid truss-like cross section open at opposite ends, the carrier is formed from one or two pieces of relatively light sheet metal (for example, aluminum .025 or steel .021 of an inch thick) bent along lines extending longitudinally of the carrier to form a generally flat bottom 26, side panels 27 upstanding at right angles along opposite margins of the bottom 26, and a top defined by inclined panels 28 having the bottle holes 21 formed therein, the top panels converging upwardly to a peak in the form of a flange 29 which lie in a center plane. A right angular flange or partition 30 upstanding from the bottom 26 also lies in this plane.

In a third and the preferred arrangement shown in Figs. 1 to 10, 15, 16, and 17, the bottom, sides, and top are formed from one sheet of metal and the partition 30 is formed from a second sheet and preferably extended from the bottom to the flange 29 to connect the two rigidly and thereby form the carrier as a whole into a rigid truss structure. To this end, the partition 30 (see Fig. 10) is substantially flat and formed at its lower end with a right angular flange 32 which is received beneath a fold 33 bent out of the bottom 26 along the longitudinal center line thereof. The fold when collapsed downwardly as shown in Figs. 7 and 17, not only holds the partition against the bottom but also coacts with upstanding bosses 34 to hold the partition securely against lateral displacement.

The upper end of the partition is disposed as shown in Fig. 7 between the margins 35 and 36 of the other sheet metal piece forming the flange 29. The extended end portions 37 of the margin 35 are bent over the top of the partition 30 and the margin 36 (Figs. 1 and 7) and folded flatly against the latter. In a similar manner, the extended part 38 of the margin 36 at the center of the latter (see Fig. 1) is similarly bent around the margin 35, all three of the parts being further interlocked by indentations 39.

The first sheet of metal is bent along longitudinal lines and punched and embossed at the proper points to form the bottom, sides, and top of the carrier. Thus, the sheet is first punched out and bent to start the fold 33 (Fig. 12), embossed (Fig. 13) punched and formed to produce the bottle holes 21 (Fig. 14) and then folded substantially to its final cross-section (Fig. 15) preparatory to insertion of the partition 30 (Fig. 16). In the final step (Fig. 17), the fold 33 is clenched and the parts 37 and 38 are folded over to complete the flange 29.

For purposes of reinforcement and also to receive advertising matter, rectangular depressions 40 are punched in sides 27. Separate plates 19 (Fig. 4) bearing advertising may be set into these depressions and removably held therein by marginal tabs projecting through slots 41 in the panels 27. Being set inwardly from the outermost surfaces of the sides 27, the advertising plate is effectually held out of contact with adjacent carriers or other objects in handling and service use.

The bottle holes 21 preferably are made elliptical in shape with the edges thereof defined by flanges 42 of substantial width formed by bending the marginal metal inwardly after initially punching elliptical holes smaller than the final bottle hole 21 by an amount equal to the desired width of the reinforcing flange 42. Additional reinforcing flanges defining the carrier ends 24 are bent downwardly at the ends of the top panels 28 to further strengthen the ends of these panels which ends are necessarily made narrow in order to attain the desired short spacing of the end bottles from the ends 24 of the carrier. Further strengthening is achieved by forming hems 43 (Fig. 1) along the ends of the bottom 26, the sides 27 and at the ends of the partition 30, this being done before the bending of the metal sheet. Thus, although most of the metal must be removed in order to form the closely spaced bottle holes 21, the integral character of the top panels 28 is preserved and the required rigidity of these panels is attained in spite of the narrowness of the portions 28ᵃ (¼ of an inch) of the top panels 28 between the adjacent holes 21 and also of the end portions 28ᵇ (⅛ of an inch) between the outer surface of the end flange 24 and the inner surface of the flange 42 of the adjacent bottle hole 21. It will be observed from Fig. 6 that both of these narrowed portions 28ᵃ and 28ᵇ are of channel cross section and therefore offer optimum resistance to bending in all directions.

As a result of the construction described above, it has been possible to maintain a uniform lateral and longitudinal bottle spacing substantially equal to that used in the standard partitioned bottle case while at the same time making the over-all dimensions of the individual carriers 20 small enough, $5\frac{1}{16}$ inches wide and $8\frac{3}{32}$ inches long in the present instance, to enable four of the carriers to fit within the standard case frame 18 (see Figs. 7 and 8) with the clearance desired for ready insertion and removal of the carriers.

In order that the bottles may be loaded into the carrier by dropping axially and perpendicular to the bottom 26, the bottle holes 21 are made of such size that the projection of the hole on the plane of the bottom 26 is a circle of a diameter equal to the maximum diameter of the bottle plus a clearance to provide the desired looseness for enabling the bottles to be guided into the holes by the fingers of a standard loading machine which fingers project into the bottle holes during the loading operation. A clearance of 3/64 of an inch has been found to be adequate and accordingly the diameter along this minor axis of the ellipse equals $2\frac{15}{32}$ inches in the present instance while the diambeter on the major axis as determined by the inclination of the holes is $3\frac{1}{32}$ inches herein.

The width of each side of the bottom 26 between the upright side panel 27 and the center partition 30 is somewhat greater than the diameter of the lower end of the bottles which, in the case of the bottle illustrated, is substantially the same as that of the enlarged part of the bottle body. The partition 30 thus serves to hold the bottoms of the bottles of the two rows separated from each other, the top parts of the bottle bodies being held out of contact with each other by virtue of their engagement with the hole flanges 42. Circular projections 44 (Figs. 2 and 4) shallower and smaller in diameter than the bottle recesses 17 are embossed upwardly in the bottom 26 to provide recesses on the under side of one carrier bottom adapted to receive the tops 12ᵃ of the bottles of a second carrier stacked on top of the first. Since the bottle centers 22 are spaced uniformly both laterally and longitudinally of the carriers, the latter may be cross stacked with the bottoms of one carrier overlapping and receiving the caps on the bottles of two different carriers. The rigidity of a stack of the carriers is thus increased, and the stack may be made in any shape according to the floor space available or the desired manner of displaying the filled carriers.

The top panels 28 of the carrier are so inclined and positioned relative to the bottom 26 as to engage the bottles and hold each bottle against tipping both laterally and longitudinally of the carrier. To accomplish this, these panels join the top flange 29 near the top of the enlarged part of the bottle body which part is thus engaged by the uppermost part of the hole flange 42 (Fig. 4). At the same time, the panels 28 are inclined at an angle of approximately 35 degrees relative to the bottom 26 so that the minor axes of the elliptical flanges 42 are disposed below the vertical centers 15 of the bottles resting on the bottom 26 but above the center of gravity 16 of the latter so as to prevent the bottles from tilting longitudinally of the carrier and sliding out of the open ends when the carrier is tipped in a longitudinal plane. The tendency of the bottles to tip in this plane or become displaced at their bottoms by shaking or other rough handling of the carrier is also resisted by two bosses 49 pressed upwardly out of the bottom 26 between the adjacent bottles, the opposite edges of these bosses being shaped to fit around the sides of adjacent bottles at the bottom thereof. As shown in Fig. 6, these bosses are somewhat higher than the projections 44.

To minimize the over-all height of the carrier and facilitate handling and stacking thereof, a separately formed handle 50 is centered both laterally and longitudinally of the carrier and arranged to slide vertically between a lower position (Figs. 1, 4 and 6) beneath the taps 12ᵃ of the bottles in the carrier and a raised or carrying position shown in phantom in Figs. 6 and 7.

Preferably, the handle is an inverted U-shaped piece of wire or bail having a substantially straight handle or gripping portion 52 somewhat longer than the width of a person's hand and parallel legs 51 extending at right angles to the handle portion and guided by the flanges 29 and 30 for movement relative to the carrier. Herein, the guide surfaces are formed by pressing the two parts 35 and 36 of the flange 29 outwardly as indicated at 54 so as to form guideways corresponding in shape to the handle legs 51 which are thus adapted to slide freely in the central plane of the carrier.

To minimize the possibility of the handle guides becoming deformed during rough handling of the carrier, the guideways for the handle legs 51 are lengthened considerably by also providing guide surfaces on the bottom flange or partition 30 so as to form extensions of the upper ways 54 in alinement with the latter. The handle legs project into these extensions so that in addition to obtaining a more rugged mounting of the handle, the latter is itself utilized to further reinforce the carrier as a whole by resisting relative lateral displacement of the top and bottom of the carrier.

In the form shown in Figs. 1 to 10, the lower guides are formed by slotting the upper part of the partition plate 30 as indicated at 55 (Figs. 1 and 10) and bending the adjacent metal into curls 56 around the handle legs 51, the curls being only slightly larger than the legs and, in the final assembly, being disposed in register with the upper guide elements 54. To produce optimum strengthening of the carrier as a whole, it is preferred to extend the lower guides 56 upwardly into the flange 29 within the upper guides 54 which therefore are made correspondingly larger in diameter than the handle legs. The curls 56 are of course formed around the handle legs before assembly of the partition 30 in the carrier proper.

Upward movement of the handle relative to the carrier is limited by engagement of abutments 57 on the handle legs 51 with stops 58 preferably formed in the flange 30 and rigid with the bottom of the carrier so that the lifting force applied to the handle will be transmitted to the bottom instead of to the top of the carrier. These abutments and stops take various forms according to the character of the abutments on the bail and the construction of the center flange 29. In the preferred form, the handle abutments 57 comprise lateral projections formed by bending the lower end portions of the bail legs 51 at right angles and toward each other in the plane of the handle. These projections lie in vertical grooves 59 pressed into the lower half portion of the plate 30 with one edge alined with the guides 56. The stops 58 for limiting the upward movement of the handle is formed by the lower ends of these guides or curls 56.

When the handle 51 is released, it will slide downwardly until the abutments 57 encounter the carrier bottom 26, as shown in Fig. 4, the gripping portion 52 then being spaced (see Fig. 2) a short distance above the upper edge of the flange 29 to allow for ready insertion of one's fingers preparatory to lifting the carrier. The handle is, however, disposed below the tops of the bottles in the carrier and, in this position, permits stacking of one carrier upon another. When a lifting force is applied to the handle, the legs 51 slide upwardly in the guides, the horizontal portion 52 moving above the bottle tops so that the carrier will hang suspended and may be carried about without interference by any of the bottle tops. The lifting force is transmitted directly to the bottom 26 of the carrier so as to minimize the possibility of bending or deforming the handle or the carrier during rough handling of the latter.

The carrier constructed as described above possesses numerous practical advantages. The truss-like cross section and the center connection 30 between the bottom and the top flange together with the reinforcement provided by the numerous bends and deformations of all parts and by the handle connection between the top and bottom provide optimum rigidity and resistance to deformation of the carrier as a whole. The flanges 24 and 42 at the ends and around the holes in the top panels contribute materially to rigidity and impart the necessary strength to this part of the carrier without necessitating elongation of the carrier to widen the connecting parts 28ª and 28ᵇ. As a result, the desired durability to withstand severe and prolonged service abuse is thus achieved with metal of light gauge while at the same time leaving the ends fully open to facilitate cleaning of the carrier when empty.

An even more important advantage of the described construction is the maintenance of minimum over-all length and width of the carrier so that, in spite of the necessity of making the holes 21 large enough to provide loading clearance around the bottles, these holes may be spaced close enough together and to the ends 24 and the sides 25 of the carrier to permit the approximate center spacing of the bottles in a standard carrying case to be preserved when a plurality of the carriers are arranged side by side (see Fig. 7) and end to end (see Fig. 6). That is to say, each terminal bottle in a row is spaced from the adjacent side 25 and the end 24 of the carrier exterior a distance equal to one half the spacing of the adjacent bottles within the carrier. Accordingly, four of the carriers 20 placed side by side and end to end may be received with the necessary looseness to permit loading and unloading in a case frame 18 of standard size as shown in Fig. 8. The axes 23 of the bottle holes 21 will then be spaced equidistantly both laterally and longitudinally and such spacing will be substantially the same as that of the bottle centers in a standard partitioned handling case. As a result, twenty-four bottles arranged in an ordinary case loading machine as shown in Fig. 9 may be dropped through the carrier holes 21 thus filling the four carriers in the same way that the holes in an ordinary partitioned case are filled. The operation of loading bottles in case lots is therefore the same irrespective of whether the bottles are to be separated in the handling cases by the usual partitions or by the apertured top panels 28 of several carriers 20. By avoiding the necessity of inserting and removing the bottles individually as with the cardboard cartons now in common use, labor costs are reduced appreciably.

The making of the partition plate 30 as a separate piece of metal and the use thereof to form a center connection between the top and bottom of the carrier is also advantageous. It forms a cross-brace to unite the remaining parts into a truss-like cross-section substantially increasing the over-all rigidity of the carrier as a whole and enabling thinner metal to be used in manufacture. In addition, it simplifies the forming and assembly steps as shown in Figs. 12 to 16 thereby enabling the manufacturing cost to be reduced to a minimum.

The center flange 30 may take other forms while serving as a partition to separate the two rows of bottles and while guiding and anchoring the lower ends of the handle legs 51. One such form is shown in Fig. 11 wherein the flange is formed by bending a metal sheet into U-shape and spot-welding or otherwise securing outturned flanges 62 directly to the bottom 26. The handle legs 51 are guided in holes in the upper closed end of the U which forms the abutment 58 for engaging the handle projections 57 to limit the upward movement of the handle.

I claim as my invention:

1. A bottle carrier having, in combination, a flat bottom, sides upstanding from and normal to said bottom along opposite margins thereof, a top having bottle-receiving holes spaced above said bottom and rigid with said sides, vertical guideways of substantial lengths rigid with both said bottom and said top, an inverted U-shaped bail having legs engaged intermediate their ends by and slidable in said guideways and laterally supported throughout the lengths of the guideways, and means on said carrier cooperating with abutments on the legs of said bail to limit the upward withdrawal of the bail relative to the carrier.

2. A sheet metal bottle carrier having, in combination, one piece comprising a flat bottom, sides upstanding from opposite margins of said bottom, top walls converging upwardly from said sides and terminating in a flange perpendicular to said bottom, a partition rigidly connecting said bottom and said flange and joining said bottom, sides and top walls into a rigid truss structure, an inverted U-shaped handle, guides for the legs of said handle formed out of the overlapping parts of said flange and said partition and surrounding said legs, and stops and abutments on said handle and guides coacting to limit the upward movement of the handle.

3. A sheet metal bottle carrier having, in combination, one piece comprising a flat bottom, sides upstanding from opposite margins of said bottom, top walls converging upwardly from said sides and terminating in a flange perpendicular to said bottom, a partition rigidly connecting said bottom and said flange and joining said bottom, sides and top walls into a rigid truss structure, an inverted U-shaped handle, guides for the legs of said handle formed out of the overlapping parts of said flange and said partition and surrounding said legs, and stops and abutments on said handle and guides coacting to limit the upward movement of the handle, said guides being bent out of the upper part of said partition and clamped between the parts of said flange.

4. A sheet metal bottle carrier having, in combination, one piece comprising a flat bottom, sides upstanding from opposite margins of said bottom, top walls converging upwardly from said sides and terminating in a flange perpendicular to said bottom, a second piece rigidly connecting said bottom and said flange and joining said bottom, sides, and top walls into a rigid truss structure, a handle having depending legs slidable in guides formed in said flange and in tubes bent out of the upper part of said partition, extending downwardly below said flange, and laterally bent projections on the lower ends of said legs coacting with the lower ends of said tubes to limit the upward movement of said handle.

5. A bottle carrier folded from sheet metal and comprising a generally flat rectangular bottom, flat sides upstanding from opposite margins of said bottom, flat rectangular top walls converging upwardly from said sides to a central peak and each having a row of elliptical holes punched therefrom and adapted to loosely receive a plurality of bottles simultaneously dropped endwise therethrough and perpendicular to said bottom, the major diameters of said holes extending transversely of said top walls and in the direction of incline thereof, downturned elliptical flanges formed around each of said holes and projecting toward said bottom, the flanges of the adjacent holes of the same and different rows being spaced apart equal distances both laterally and longitudinally of said bottom and the end and side edges of said top walls being spaced outwardly from the adjacent portions of the adjacent flanges a distance equal to one-half of said first mentioned distances, and downturned flanges formed along the ends of said top walls and disposed perpendicular to said bottom.

6. A bottle carrier folded from sheet metal and comprising a generally flat rectangular bottom, flat sides upstanding from opposite margins of said bottom, flat rectangular top walls converging upwardly from said sides to a central peak and each having a row of elliptical holes punched therefrom and adapted to loosely receive a plurality of bottles simultaneously dropped endwise therethrough, the major diameters of the holes extending transversely of said top walls and in the direction of the incline thereof, downturned elliptical flanges formed around each of said holes, the flanges of the adjacent holes of the same and different rows being spaced apart equal distances both laterally and longitudinally of said bottom and each flange being spaced inwardly from the adjacent end or side edge of the top wall a distance equal to one-half of said first mentioned distances, and downturned flanges formed along the ends of said top walls and cooperating with the adjacent hole flanges to form rigid channels.

7. A bottle carrier folded from sheet metal and comprising a generally flat rectangular bottom, flat sides upstanding from opposite margins of said bottom, flat rectangular top walls converging upwardly from said sides to a central peak, a row of elliptical holes punched from each of said top walls and adapted to loosely receive a plurality of bottles simultaneously dropped endwise therethrough, the major diameter of each elliptical hole extending transversely of said top walls and in the direction of the incline thereof, and flanges depending from and extending continuously around the edges of said holes and projecting toward said bottom, the flanges of the adjacent holes of the same and different rows being spaced apart and the end and side edges of said top walls being spaced outwardly from the nearest portions of the adjacent flanges.

8. A bottle carrier folded from sheet metal and comprising a generally flat bottom, flat sides upstanding from opposite margins of said bottom, flat rectangular top walls converging upwardly from said sides to a central peak, a row of holes punched from each of said top walls and adapted to loosely receive a plurality of bottles simultaneously dropped endwise therethrough, each of said holes being elongated in the direction of the incline of said top walls, flanges depending toward said bottom and extending around the edges of said holes, and downturned flanges at opposite ends of said top walls, the adjacent end and peripheral flanges being spaced apart and cooperating with the intervening portions of said top walls to form rigid channels at the ends of the top walls and between the adjacent holes.

ERNEST T. WAHLBOM.

REFERENCES CITED

The following references are of record in the file of this patent:

UNITED STATES PATENTS

| Number | Name | Date |
| --- | --- | --- |
| 907,912 | Stock | Dec. 29, 1908 |
| 1,268,124 | Jennings | June 4, 1918 |
| 2,339,168 | Hutchings | Jan. 11, 1944 |
| 2,393,114 | Lyons, Jr. | Jan. 15, 1946 |
| 2,425,140 | Allen | Aug. 5, 1947 |
| 2,431,231 | Darnell | Nov. 18, 1947 |
| 2,435,178 | Marshall | Jan. 27, 1948 |
| 2,467,106 | Adkins | Apr. 12, 1949 |
| 2,532,725 | Laier | Dec. 5, 1950 |